United States Patent [19]

Akiyama et al.

[11] 4,436,840

[45] Mar. 13, 1984

[54] PROCESS FOR PRODUCING PRE-FOAMED PARTICLES OF POLYOLEFIN RESIN

[75] Inventors: Hiroyuki Akiyama, Hiratsuka; Sumio Shimada, Kanuma; Kuninori Hirosawa, Isehara; Hideki Kuwabara, Hatano, all of Japan

[73] Assignee: Japan Styrene Paper Corporation, Tokyo, Japan

[21] Appl. No.: 420,874

[22] Filed: Sep. 21, 1982

[30] Foreign Application Priority Data

Sep. 28, 1981 [JP] Japan .............................. 56-153230

[51] Int. Cl.$^3$ .......................... C08J 9/22; B29D 27/00
[52] U.S. Cl. ........................................... 521/58; 264/53; 264/DIG. 9; 521/56; 521/60
[58] Field of Search ................................ 54/58, 56, 60; 264/DIG. 9, 53

[56] References Cited

U.S. PATENT DOCUMENTS 3,428,720 2/1969 Deuslow ...................... 264/DIG. 9
4,032,609 6/1977 Smith ............................. 264/DIG. 9

*Primary Examiner*—Morton Foelak
*Attorney, Agent, or Firm*—Sherman & Shalloway

[57] ABSTRACT

In a process for producing pre-foamed particles of a polyolefin resin which comprises impregnating a volatile blowing agent into particles of a polyolefin resin while dispersing the resin particles and the blowing agent in a dispersing medium under heat in a closed vessel, opening one end of the vessel and releasing the resin particles and the dispersing medium simultaneously into an atmosphere kept at a lower pressure than the inside pressure of the vessel; the improvement wherein the pressure of the inside of the vessel after opening its one end is maintained at a substantially constant pressure which is at least 0.7 times the vapor pressure f of the blowing agent before opening the end of the vessel.

2 Claims, No Drawings

PROCESS FOR PRODUCING PRE-FOAMED PARTICLES OF POLYOLEFIN RESIN

This invention relates to a process for producing pre-foamed particles of a polyolefin resin. More specifically, it relates to a process for producing pre-foamed particles of a polyolefin resin having a uniform cell diameter and a uniform expansion ratio.

One process known for producing pre-foamed particles of a polyolefin resin comprises dispersing particles of a polyolefin resin containing a volatile blowing agent in water in a closed vessel, heating the dispersion to a temperature above the softening point of the resin while maintaining the pressure of the inside of the vessel at the vapor pressure of the blowing agent or higher, thereafter opening one end under the water surface of the vessel, and releasing the particles and water simultaneously into an atmosphere kept at a lower pressure than the pressure of the inside of the vessel (Japanese Patent Publication No. 1344/1981). The pre-foamed particles obtained by this process, however, frequently have a non-uniform cell diameter and a non-uniform expansion ratio. Hence, foamed molded articles obtained from these pre-foamed particles have the defect that melt-adhesion is poor at those parts which have a low expansion ratio, or those parts which have a small cell diameter have low mechanical strength.

It is an object of this invention therefore to provide a process for producing pre-foamed particles of a polyolefin resin which are free from the aforesaid defects of the prior art and have a uniform cell diameter and a uniform expansion ratio.

According to this invention, there is provided, in a process for producing pre-foamed particles of a polyolefin resin which comprises impregnating a volatile blowing agent into particles of a polyolefin resin while dispersing the particles and the blowing agent in a dispersing medium under heat in a closed vessel, opening one end of the vessel and releasing the particles and the dispersing medium simultaneously into an atmosphere kept at a lower pressure than the inside pressure of the vessel, the improvement wherein the pressure of the inside of the vessel after opening its one end is maintained at a substantially constant pressure which is at least 0.7 times the vapor pressure of the blowing agent before opening the end of the vessel.

Typical examples of the polyolefin resin used in this invention are polyethylene resins and polypropylene resins which may be crosslinked or non-crosslinked. Non-crosslinked polypropylene resins are especially beneficial. The polypropylene resins may include a propylene homopolymer, an ethylene-propylene random copolymer, an ethylene-propylene block copolymer, and mixtures of these polymers with other polymers.

Illustrative of suitable volatile blowing agents for use in this invention are aliphatic hydrocarbons such as propane, butane, pentane, hexane and heptane; cycloaliphatic hydrocarbons such as cyclobutane and cyclopentane; and halogenated hydrocarbons such as trichlorofluoromethane, dichlorodifluoromethane, dichlorotetrafluoroethane, methyl chloride, ethyl chloride and methylene chloride. The amount of the blowing agent to be added varies depending upon the type of the blowing agent and the desired degree of expansion, but is usually 5 to 40 parts by weight per 100 parts by weight of the polyolefin resin particles.

In the present invention, the time of including the volatile blowing agent into the polyolefin resin particles is not particularly restricted. For example, the resin particles and the blowing agent may be put into a closed vessel and the blowing agent may be included in the resin particles while dispersing the resin particles and the blowing agent in a dispersing medium. Or it is also possible to put the blowing agent into the closed vessel during or after the resin particles are heated to a predetermined temperature within the closed vessel, and then to include the blowing agent into the resin particles while dispersing both the resin particles and the blowing agent in the dispersing medium. The temperature at which the blowing agent is included in the resin particles is not critical. From the viewpoint of saving time, however, it is preferred to heat the resin particles and the volatile blowing agent to a temperature above the softening point of the resin particles while dispersing both the resin particles and the blowing agent in the dispersing medium.

According to the process of this invention, a fine powder of aluminum oxide, a fine powder of titanium oxide, basic magnesium carbonate, basic zinc carbonate, and calcium carbonate, for example, can be used as a dispersing agent. The amount of the dispersing agent is usually 0.01 to 10 parts by weight per 100 parts by weight of the resin. The dispersing medium may be a solvent which does not dissolve the resin particles, and examples include water, ethylene glycol, glycerol, methanol, ethanol and mixtures of these. Usually, water is preferred.

In the present invention, the temperature and pressure of the inside of the vessel before opening its one end are not particularly restricted. Generally, the temperature is maintained at a point above the heat deformation temperature of the resin, usually at a temperature above the point at which the resin particles soften, for example at 70° to 180° C., and the pressure is maintained at a point near the vapor pressure of the volatile blowing agent.

Let the vapor pressure of the volatile blowing agent before opening one end of the vessel be $P_o$ and the pressure of the inside of the vessel after opening it be $P_1$, then $P_1$ should be a substantially constant pressure satisfying the following expressions:

$$P_1 \geq 0.7 P_o,$$

preferably $$P_1 \geq 0.8 P_o,$$

more preferably $$P_1 \geq 1.0 P_o.$$

If $P_1$ is less than $0.7 P_o$, the resin particles tend to melt-adhere to each other in the vessel so that the pre-foaming of the resin particles becomes difficult or the resulting pre-foamed particles have a low expansion ratio. There is no upper limit set for the pressure $P_1$, but from the standpoint of the pressure resistance of the vessel, the pressure employed is usually not more than about 40 kg/cm$^2$(G).

The pressure of the inside of the vessel can be obtained by applying a back pressure through introduction of an inorganic gas such as nitrogen and air.

The number (or diameter) of the cells of the pre-foamed particles tends to be larger (or smaller) as the pressure $P_1$ at the time of foaming becomes higher. Hence, pre-foamed particles having the desired number of cells can be obtained by adjusting the pressure $P_1$ as required. In view of the properties of a foamed molded article to be obtained from the pre-foamed particles, the pressure $P_1$ is especially preferably from 15 to 40 kg/cm$^2$(G).

The vapor pressure of the volatile blowing agent, as referred to in this invention, denotes the vapor pressure of the volatile blowing agent in a system in which the resin particles having the blowing agent impregnated therein are dispersed in the dispersing medium, and does not always agree with the vapor pressure of the volatile blowing agent existing alone. In other words, the vapor pressure of the blowing agent varies depending upon the degree of affinity between the blowing agent and the polyolefin resin particles, the content of the blowing agent, the type of the blowing agent, etc.

In the present invention, the substantially constant pressure specifically means that the variations in the pressure $P_1$ of the inside of the vessel after opening its one end are maintained within 4 kg/cm$^2$, preferably within 3 kg/cm$^2$. This substantially constant pressure can be maintained, for example, by adjusting the operating range of a compressor and thus adjusting the back pressure attributed to the inorganic gas.

In the process of this invention, the pressure of the inside of the vessel during foaming may be maintained at 0.7$P_o$ or higher at least for the time required to obtain at least two-thirds of the pre-foamed particles to be finally obtained, and may be lower than 0.7$P_o$ after that time has elapsed.

The pre-foamed particles obtained by this invention are used to obtain foamed molded articles. Preferably, prior to being used in molding, the prefoamed particles are pressurized for a predetermined period of time with an inorganic gas such as nitrogen or air or a gaseous mixture of it with a volatile blowing agent under a predetermined pressure, thereby imparting a pressure to the inside of the particles. The particles having the internal pressure so applied are then filled in a mold, and heated with steam under a pressure of 2 to 5 kg/cm$^2$(G) to give a foamed and molded article having a configuration conforming to the mold.

The foamed and molded article can be used, for example, as a packaging material, a cushioning material, a heat insulating material, a floating material, a building material, etc.

According to the present invention, pre-foamed particles of excellent quality having a uniform expansion ratio and a uniform cell diameter can be obtained by maintaining the pressure of the inside of the vessel at a certain constant pressure as described above. Foamed and molded articles obtained by using such pre-foamed particles have a uniform structure and are free from localized poor melt-adhesion between particles attributed to variations in expansion ratio or localized differences in properties (such as mechanical strength) attributed to variations in cell diameter.

The following non-limitative examples specifically illustrate the present invention.

EXAMPLES 1 TO 5 AND COMPARATIVE EXAMPLES 1 TO 3

A closed vessel was charged with polyolefin resin particles, water, and dichlorodifluoromethane in the amounts shown in the following table and 0.3 part by weight of a fine powder of aluminum oxide, and with stirring, the mixture was maintained for 30 minutes at each of the temperatures indicated in the following table. Thus, dichlorodifluoromethane was included in the resin particles. The vapor pressure $P_o$ of dichlorodifluoromethane at this time is shown in the following table.

Then, while the pressure $P_1$ of the inside of the vessel was maintained at each of the values indicated in the following table by applying a back pressure with nitrogen gas, one end of the vessel was opened. The resin particles and water were thus simultaneously released into the atmosphere to form pre-foamed particles.

The pre-foamed particles were dried, and their apparent expansion ratio and the number of their cells were measured. The number of cells was measured by a microscope. The apparent expansion ratio was calculated from their volume and weight determined by filling the pre-foamed particles in a measuring cylinder.

The results are tabulated below.

| | Formulation (parts by weight) | | | Temperature (°C.) | Vapor pressure of the blowing agent before opening the vessel ($P_o$, kg/cm$^2$.G) | Pressure of the inside of the vessel after opening the vessel ($P_1$, kg/cm$^2$.G) | Apparent expansion ratio | Number of cells per mm$^2$ |
|---|---|---|---|---|---|---|---|---|
| | Polyolefin resin particles | Dichlorodifluoromethane | Water | | | | | |
| Examples | | | | | | | | |
| 1 | Ethylene-propylene random copolymer (100) | 15 | 300 | 140 | 20 | 27–24 | 43–41 | 260–240 |
| 2 | Ethylene-propylene random copolymer (100) | 20 | 300 | 137 | 24.5 | 22–19 | 44–42 | 120–110 |
| 3 | Ethylene-propylene block copolymer (100) | 20 | 300 | 150 | 26 | 34–32 | 43–42 | 320–300 |
| 4 | Propylene homopolymer (100) | 20 | 300 | 155 | 26.5 | 33–31 | 39–37 | 360–340 |
| 5 | Ethylene-propylene random copolymer (100) | 20 | 300 | 137 | 24.5 | 26–22.5 | 45–43 | 120–140 |
| Comparative | | | | | | | | |

-continued

| | Formulation (parts by weight) | | | Temperature (°C.) | Vapor pressure of the blowing agent before opening the vessel ($P_0$, kg/cm$^2$.G) | Pressure of the inside of the vessel after opening the vessel ($P_1$, kg/cm$^2$.G) | Apparent expansion ratio | Number of cells per mm$^2$ |
|---|---|---|---|---|---|---|---|---|
| | Polyolefin resin particles | Dichlorodifluoromethane | Water | | | | | |
| Examples | | | | | | | | |
| 1 | Ethylene-propylene random copolymer (100) | 15 | 300 | 140 | 20 | 33–24 | 43–38 | 300–220 |
| 2 | Ethylene-propylene random copolymer (100) | 15 | 300 | 140 | 20 | 11–10 | 16–20 | 330–200 |
| 3 | Ethylene-propylene block copolymer (100) | 20 | 300 | 150 | 26 | 34–28 | 43–39 | 320–180 |

What is claimed is:

1. In a process for producing pre-foamed particles of a polyolefin resin which comprises impregnating a volatile blowing agent into particles of a polyolefin resin while dispersing the resin particles and the blowing agent in a liquid dispersing medium which does not dissolve the resin particles under heat in a closed vessel, opening one end of the vessel and releasing the resin particles and the dispersing medium simultaneously into an atmosphere kept at a lower pressure than the inside pressure of the vessel; the improvement wherein the pressure of the inside of the vessel after opening its one end is maintained at a substantially constant pressure which is at least 0.7 times the vapor pressure of the blowing agent before opening the end of the vessel.

2. The process of claim 1 wherein the pressure of the inside of the vessel after opening its one end is maintained at a substantially constant pressure which is at least 0.7 times the vapor pressure of the blowing agent before opening the end of the vessel and which fluctuates within 4 kg/cm$^2$.

* * * * *